(12) United States Patent
Kiu

(10) Patent No.: US 6,917,861 B2
(45) Date of Patent: Jul. 12, 2005

(54) METHOD AND APPARATUS FOR STEPPING SPACE CRAFT MECHANISMS AT LOW DISTURBANCE RATES

(75) Inventor: Ketao Kiu, Cerritos, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/386,796

(22) Filed: Mar. 12, 2003

(65) Prior Publication Data

US 2004/0181319 A1 Sep. 16, 2004

(51) Int. Cl.[7] .............................. B64G 1/44; G05D 3/00; H02P 8/80
(52) U.S. Cl. ........................ 701/13; 244/173; 318/114
(58) Field of Search ............................. 701/3, 13–14; 244/158 R, 173; 318/11–12, 15, 580, 584–586, 685–687, 696, 114

(56) References Cited

U.S. PATENT DOCUMENTS

| | | | |
|---|---|---|---|
| 4,843,294 A | 6/1989 | Bhat et al. | |
| 5,520,359 A | * 5/1996 | Merhav et al. | ......... 244/158 R |
| 5,610,848 A | 3/1997 | Fowell | |
| 6,003,817 A | 12/1999 | Basuthakur et al. | |
| 6,311,929 B1 | 11/2001 | Kazimi et al. | |
| 6,311,931 B1 | 11/2001 | Smay | |

* cited by examiner

Primary Examiner—Thu V. Nguyen
(74) Attorney, Agent, or Firm—Gates & Cooper LLP

(57) ABSTRACT

A method and system for reducing the stepping disturbances generated by a stepping mechanism is disclosed. The method is to select a desired stepping rate to step the stepping mechanism. The method further selects two desired disturbance stepping rates, one fast stepping rate and one slow stepping rate to alternate stepping of the mechanism with the two stepping rates to generate an average stepping rate that is required for the mechanism, and thereby the stepping mechanism will not significantly excite the spacecraft structural mode, and the stepping disturbance is significantly reduced while the mechanism still perform nominally its desired stepping maneuvers.

38 Claims, 6 Drawing Sheets

METHOD AND APPARATUS FOR STEPPING SPACE CRAFT MECHANISMS AT LOW DISTURBANCE RATES

BACKGROUND OF THE INVENTION

1. Field of the Invention

The present invention relates generally to systems and methods for controlling spacecraft or satellites, and in particular to a system and method for stepping spacecraft mechanisms to minimize disturbances generated by the stepping mechanism

2. Description of the Related Art

Three-axis stabilized spacecraft or satellites often have several mechanisms that step frequently during their service life. These mechanisms include mechanisms that rotate the antenna reflectors to specific targets, gimbals that scan a payload image frame across specific area of Earth surface, and solar array drivers that step solar arrays to track the Sun. Typically, the stepping function is implemented by stepper motors coupled to the spacecraft component (payloads or solar arrays) via gear-driven transmissions. Stepper motors are desirable because they are relatively simple to control reliable, lightweight and well adapted to continuous use.

However, the use of a stepper motor in spacecraft with highly flexible structural components such as large deployable payload booms, antenna reflectors, and solar arrays may potentially excite some structural modes of these components and generate significant oscillation disturbances in the spacecraft itself. This disturbance can degrade the spacecraft pointing, cause excessive activity of the spacecraft control actuators, and make autonomous spacecraft momentum dumping difficult. The induced oscillation is particularly critical in spacecraft where absolute platform stability is desirable. Vibrations can cause deterioration of any inertia-sensitive operations of a spacecraft.

This disturbance problem can be ameliorated by a number of techniques. One technique is to employ high bandwidth control loops to mitigate the impact of this disturbance to the spacecraft pointing. However, this technique has significant limitations. For many spacecraft, the structural modes that are excited by the stepping mechanisms are outside of the spacecraft control bandwidth. Consequently, these high-bandwidth control loops have only very limited effects on the disturbance. Further extension of the bandwidth of the control loops to include these structural modes will very often result in control loop stability problems. Furthermore, high-bandwidth control also unnecessarily increases actuator operation, which can increase wear and result in excess energy consumption.

A technique for minimizing the solar array drive stepping disturbance is disclosed in U.S. Pat. No. 4,843,294, entitled "Solar Array Stepping to Minimize Array Excitation," issued Jun. 27, 1989 to Bhat et al, which is hereby incorporated by reference herein. In this reference, mechanical oscillations of a mechanism containing a stepper motor, such as a solar array powered spacecraft, are reduced and minimized by the execution of step movements in pairs of steps. The period between steps is equal to one-half of the period of torsional oscillation of the mechanism. While this method can reduce structural disturbances, it is not very effective when the mechanism has significant backlash and stiction. This is because the backlash and stiction can significantly interrupt the two-step pattern of this method.

There is therefore a need for a system and method for minimizing disturbances in stepper-motor driven mechanisms that are more robust to mechanism backlash and stiction The present invention satisfies that need.

SUMMARY OF THE INVENTION

The present invention is a method and apparatus for minimizing disturbances induced by stepping mechanisms employed in a spacecraft or satellite. The apparatus and applied method steps the mechanism at rates that are selected to provide for attenuation of the interaction between spacecraft mechanism and the structural modes of spacecraft structural components such as deployable booms, antenna reflectors and solar arrays. For mechanisms requiring a constant rotational and translational rates (e.g., solar arrays to track the Sun), the apparatus and method alternates between two stepping rates, one fast stepping rate and one slow stepping rate to generate an average stepping rate of the mechanism that equals to the required rate.

The foregoing reduces interactions between spacecraft structural modes and stepping mechanisms, and is robust in the presence of mechanism backlash and stiction.

Further novel features and other objects of the present invention will become apparent from the following detailed description, discussion and the appended claims, taken in conjunction with the drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Figure 1:
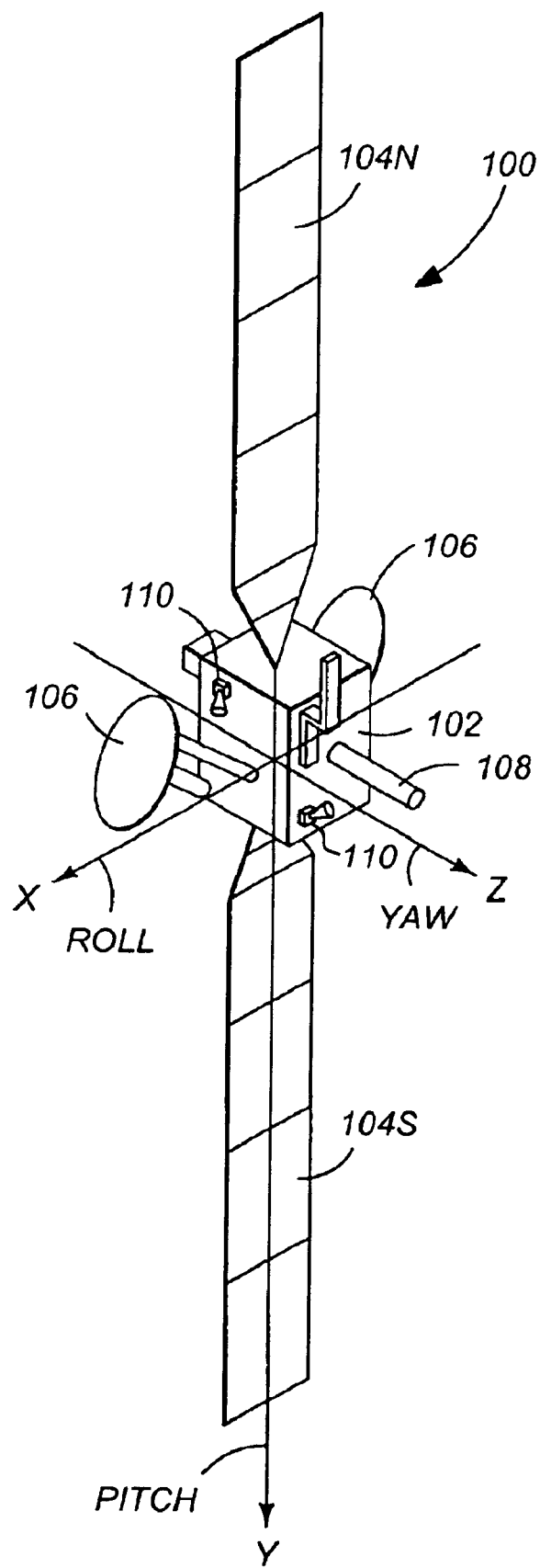
FIG. 1 is a diagram depicting a typical satellite.

FIG. 1 depicts a three-axis stabilized satellite or spacecraft 100. The spacecraft 100 is preferably situated in a stationary orbit about the Earth. The spacecraft 100 has a main body 102, a pair of solar panels 104, a pair of high gain narrow beam antennas and their reflectors 106, and a scanning payload 108 which can be used to scan a specific area of the Earth surface. The spacecraft 100 may also include one or more sensors 110 to measure the attitude of the spacecraft 100 . These sensors 110 may include sun sensors, earth sensors, and star sensors. Since the solar panels are often referred to by the designations "North" and "South", the solar panels 104 in FIG. 1 are referred to by the numerals 104N and 104S for the "North" and "South" solar panels, respectively.

The three axes of the spacecraft 100 are shown in FIG. 1. The pitch axis X lies along the plane of the solar panels 104N and 104S. The roll axis X and yaw axis Z are perpendicular to the pitch axis Y and lie in the directions and places shown. The antenna 108 points to the Earth along the yaw axis Z.

Figure 2:
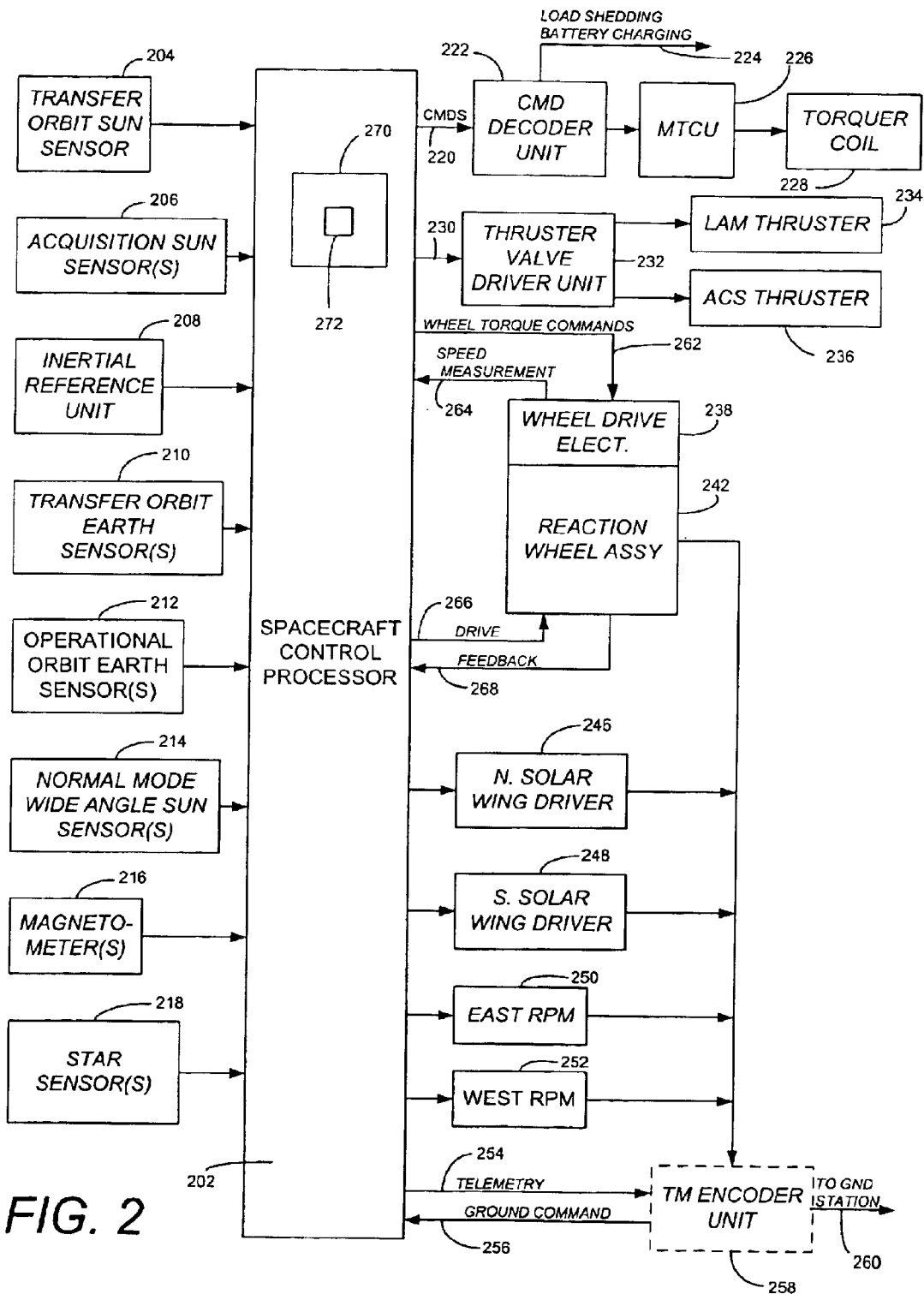
FIG. 2 is a block diagram depicting a satellite control system.

FIG. 2 is a diagram depicting the functional architecture of a representative attitude control system. Control of the spacecraft is provided by a computer or spacecraft control processor (SCP) 202. The SCP 202 performs a number of functions which may include post ejection sequencing, transfer orbit processing, acquisition control, station keeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal. The normal mode control could include attitude estimation, attitude and solar array steering, momentum bias control, magnetic torquing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit 222 operates the load shedding and battery charging systems 224. The command decoder unit 222 also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Generally, the spacecraft 100 may use thrusters, momentum/reaction wheels, or a combination thereof to perform spacecraft attitude control.

Wheel torque commands 262 are generated by the SCP 202 and are communicated to the wheel drive speed electronics 238. These effect changes in the wheel speeds for wheels in reaction wheel assembly 242. The speed of the wheels is also measured and fed back to the SCP 202 by feedback control signal 264.

The SCP 202 communicates with the telemetry encoder unit 258, which receives the signals from various spacecraft components and subsystems indicating current operating conditions, and then relays them to the ground station 260.

The wheel drive electronics 238 receive signals from the SCP 202 and control the rotational speed of the reaction wheels.

Other spacecraft employ momentum wheels, external torquers, chemical or electric thrusters, magnetic torquers, solar pressure, etc. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP SPC 202, causes the spacecraft control processor 202 to perform the steps necessary to implement and/or use the present invention. Computer program and/or operating instructions may also be tangibly embodied in memory 270 and/or data communications devices (e.g., other devices in the spacecraft 100 or on the ground), thereby making a computer program product or article of manufacture according to the present invention. As such, the terms "program storage device," "article of manufacture" and "computer program product" as used herein are intended to encompass a computer program accessible from any computer readable device or media.

Figure 3:
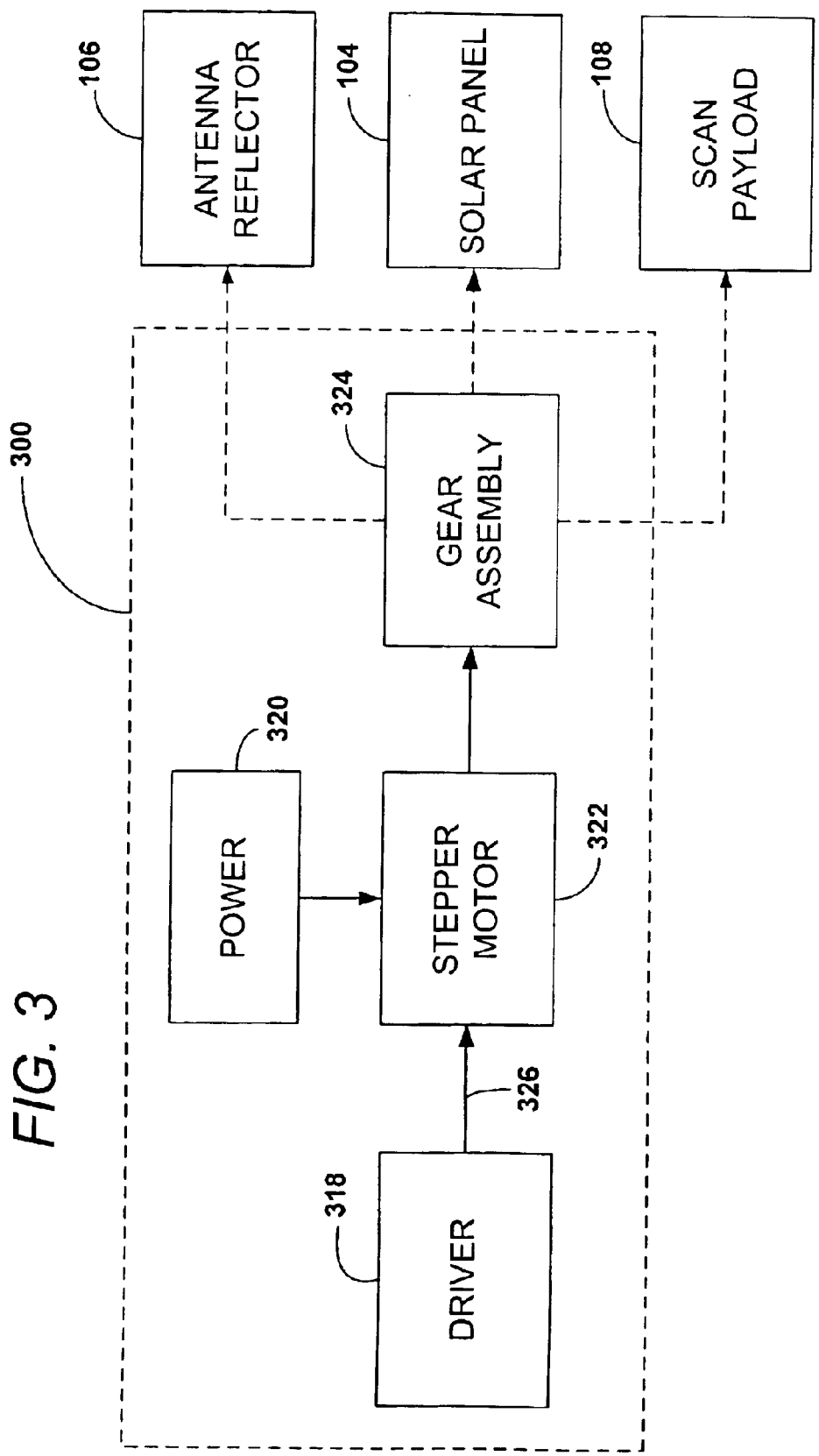
FIG. 3 is a block diagram depicting a stepper motor mechanism usable to manipulate a solar panel to track the Sun.

FIG. 3 is a block diagram of a typical spacecraft mechanism 300 that can be used to implement the North solar wing driver (SWD) 246 or the South SWD 248, the East RPM 250 or the West RPM 252, or the payload scanning gimbals (not shown). The antenna reflector 106E or 106W, solar panel 104N or 104S, or scan payload 108 (hereinafter alternately referred to as antenna reflector(s) 106 and solar panel(s) 104) is driven by the gear assembly 324 which in turn is coupled to the stepper motor 322. The stepper motor 322 is provided with a suitable power source 320 to supply motive force to the gear assembly 324. A driver 318 provides the input signal by appropriate signal lines 326 to the stepper motor 322. The driver 318 is controlled by the SCP 202 from which necessary step rate can be derived for the function applied to the stepper motor 322. The driver 318 may include the North SWD 246, the South SWD 248, the East RPM 250, the West RPM 252 or the payload scanning gimbals.

The present invention reduces the interaction between spacecraft structural vibration and spacecraft mechanism 300 stepping. Such an interaction is usually due to the fact that spacecraft structural modes and mechanism 300 stepping harmonics stay very close together in frequency. The present invention reduces this interaction by reducing the magnitude of the mechanism 300 harmonics that are close to the structural modes.

The present invention selects desired rates to step the mechanism. By way of example, the rates may include 0.2875 times, 0.3 times, 0.4 times, 0.4285 time, 0.667 times, 0.75 times, 2 times, and 3 times of the spacecraft structural mode frequency. For the mechanism such as solar wing drivers that need to track the Sun at a constant rate, the invention alternates between two stepping rates, one high stepping rate and one low stepping rate to generate an average stepping rate of the mechanism that the SWD still delivers an approximate sun tracking rate of 0.004 degrees on average.

It will be appreciated that the present invention is not limited to the stepping rates depicted above. It is within the spirit and scope of the present invention to utilize other stepping rates not discussed.

Figure 4:
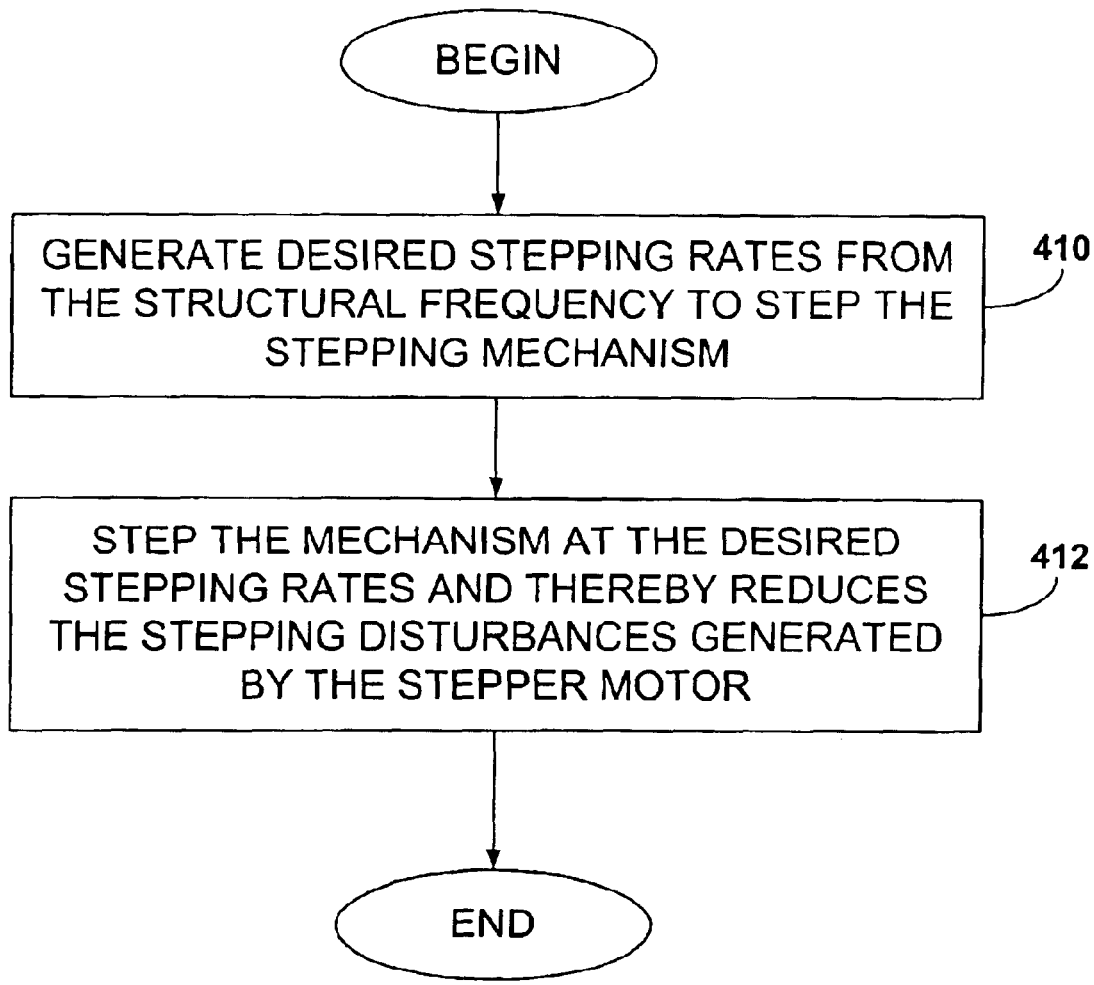
FIG. 4 is a flow chart illustrating exemplary process steps used to practice one embodiment of the present invention.

FIG. 4 is a flow chart depicting exemplary process steps used to practice one embodiment of the present invention. The method comprises the steps of selecting a stepping rate of the mechanism 300 to reduce the mechanism 300 stepping disturbances around significant structural modes. The mechanism 300 step rate must be appropriately selected. Therefore, according to the present invention, a desired stepping rate for a structural frequency of the spacecraft is generated to step the stepping mechanism, as shown in block 410. When a desired stepping rate is required as in the case of a solar array stepping, the stepping mechanism is alternately stepping between a fast stepping rate and a slow stepping rate to generate an average stepping rate of the stepping mechanism that equals to the desired stepping rate. Both fast and slow rates are so chosen to reduce the induced stepping disturbances generated by the stepper motor, as shown in block 420.

Without loss of generality, assume that the magnitude of the mechanism 300 disturbance generated by a single step is 1. Given the fact that the disturbance will be sinusoidal in nature, the disturbance can be represented by the following complex number in the complex plane (see FIG. 5) with f being the structural frequency and t being the time that the step is taking place.

Figure 5:
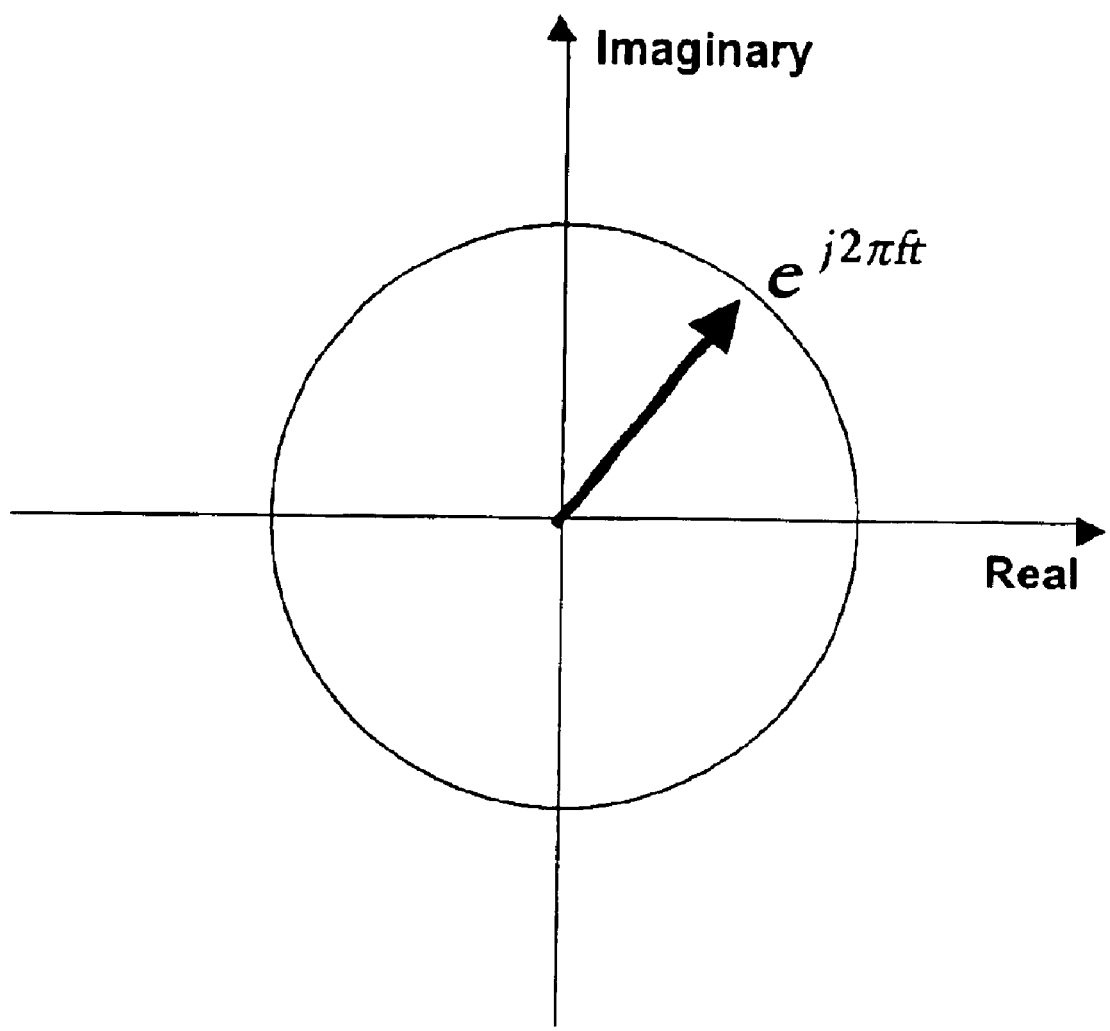
FIG. 5 is a graph showing a single step disturbance represented in a complex plane.

FIG. 5 is a graph showing a single step disturbance represented in a complex plane. Assume that the mechanism 300 is stepping at s times of structural frequency rate. After n+1 steps, the following will be the total disturbance generated by these steps, $$\sum_{k=0}^{n} e^{j\frac{2\pi fk}{sf}} = \sum_{k=0}^{n} e^{j\frac{2\pi k}{s}} = \frac{1 - e^{j2\pi\frac{n+1}{s}}}{1 - e^{j2\pi\frac{1}{s}}} = \frac{\sin\frac{\pi(n+1)}{s}}{\sin\frac{\pi}{s}} e^{j\frac{\pi n}{s}}$$

when 1/s is not an integer.

Therefore the magnitude of the total disturbance is given by the following equation:

$$\frac{\sin\frac{\pi(n+1)}{s}}{\sin\frac{\pi}{s}}$$

Figure 6:
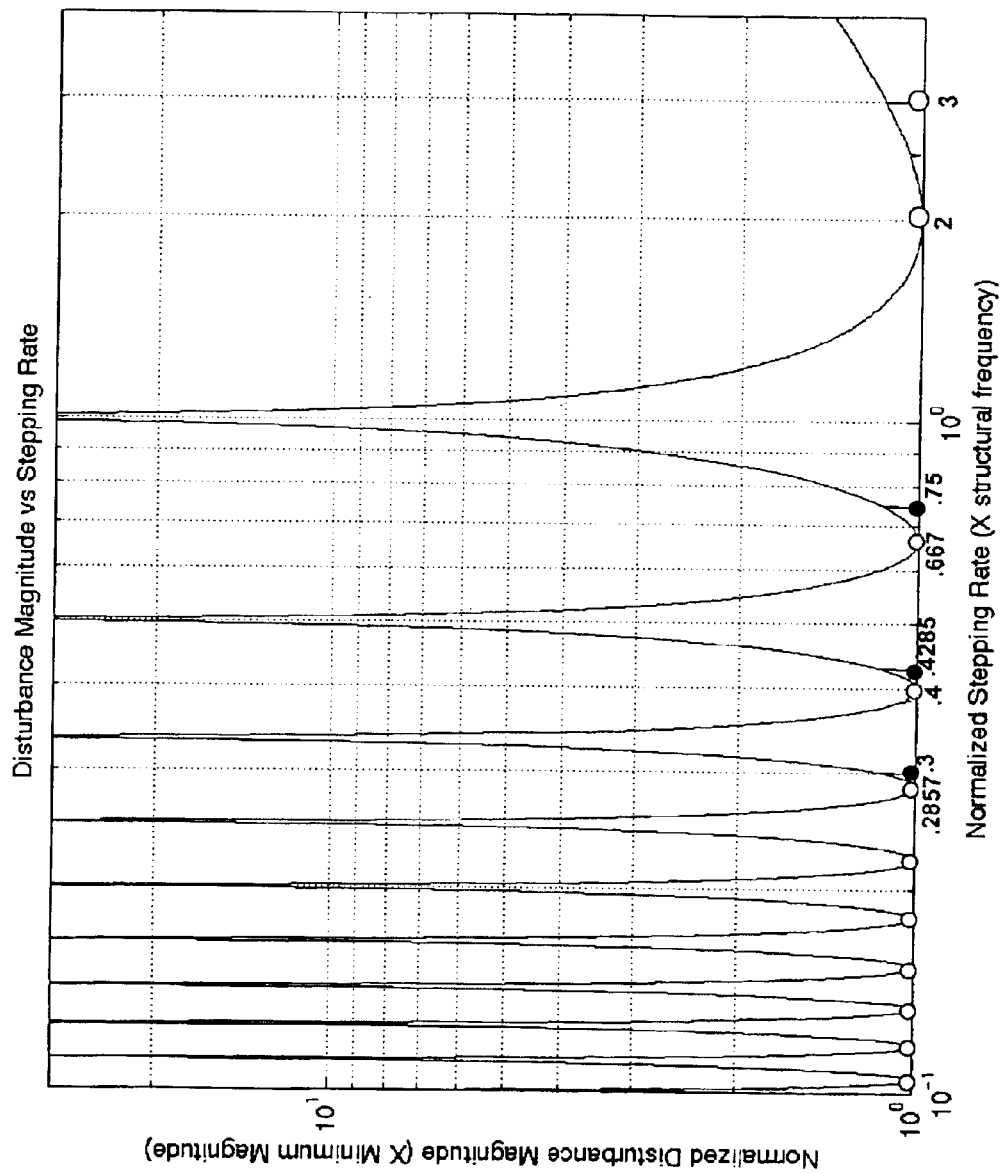
FIG. 6 is a graph showing the total magnitude versus the stepping rate coefficient s that represents how many times the mechanism is stepping with respect to the structural frequency.

FIG. 6 shows a plot of the disturbance magnitude versus the mechanism step rate. The plot shows the total magnitude versus the stepping rate coefficient s that represents how many times the mechanism is stepping with respect to the structural frequency. The plot shows that there are many stepping rates that will generate a minimum disturbance magnitude of 1 that equals to the disturbance generated by a single mechanism step. Thus, if the mechanism is not required to step at a particular rate, one can select one rate out of these minimum rates based on other criteria.

If the mechanism is required to step at a desired rate and the rate generates a high disturbance magnitude, one can select two stepping rates out of these minimum rates or out of the small rate ranges around these minimum rates and the mechanism 300 steps alternately between these stepping rates. By way of example, the mechanism 300 can step at 2 (or a rate close to 2) times the structural frequency and then 0.667 (or a rate close to 0.667) times the structural frequency for an equal number of steps to generate an average step rate equal to the structure frequency.

This concludes the description of the preferred embodiments of the present invention. In summary, the present invention describes a method, apparatus and article of manufacture for reducing the stepping mechanism disturbance induced by the mechanism 300 stepping.

The method comprises the steps of reducing the stepping disturbances generated by a stepper motor which is controlled by a stepping mechanism exciting a structural frequency. A first step is to select a desired stepping rate for reducing the mechanism stepping disturbances generated by the mechanism controlled by the stepper motor. Some minimum stepping rates for the mechanism 300 to generate minimum disturbance are shown in FIG. 6. All minimum disturbance rates can also be computed by solving the equation $$\frac{\sin\frac{\pi(n+1)}{s}}{\sin\left(\frac{\pi}{s}\right)} = 1 \text{ for } n = 0, 1, \ldots$$

In addition to the minimum rates, FIG. 6 also shows that stepping rates dose to these minimum rates also generate very small disturbances and therefore can be selected as desired stepping rates for reducing the mechanism disturbance. By way of example, if the desired stepping rate does not equal to one of these rates, two rates, one fast stepping rate and one slow stepping rate can be selected to alternate stepping of the mechanism 300 to generate an average stepping rate that equals to the desired stepping rate.

The apparatus comprises means for reducing mechanism 300 stepping disturbances around at least one mechanism controlled by a stepper motor using desired stepping rates. Some minimum disturbance stepping rates for the mechanism 300 to generate minimum disturbance are shown in FIG. 6. All minimum stepping rates can also be computed by solving equation (1). In addition to the minimum rates, FIG. 6 also shows that stepping rates close to these minimum rates also generate very small disturbances and therefore can be selected as desired stepping rates for reducing the mechanism disturbance. By way of example, if the desired stepping rate does not equal to one of these stepping rates, one fast stepping rate and one slow stepping rate can be used to alternately stepping the mechanism 300 to generate an average stepping rate that equals to the desired stepping rate.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing form the spirit and scope of the invention, the invention resides in the claims hereinafter appended.

What is claimed is:

1. A method of reducing disturbances induced by stepping an appendage having a structural frequency with a stepping mechanism having a stepping motor, the method comprising the steps of:

generating a desired stepping rate from said structural frequency to step said appendage, wherein the desired stepping rate is calculated by solving $$\frac{\sin\frac{\pi(n+1)}{s}}{\sin\frac{\pi}{s}} = 1,$$

n=0,1, ... for s where s represents said stepper motor stepping at s times of said structural frequency; and stepping the appendage at said desired stepping rate, thereby reducing the induced stepping disturbances generated by said stepping mechanism.

2. The method of claim 1, wherein said desired stepping rate includes 3 times of said structural frequency.

3. The method of claim 1, wherein said desired stepping rate includes 2 times of said structural frequency.

4. The method of claim 1, wherein said desired stepping rate includes 0.75 times of said structural frequency.

5. The method of claim 1, wherein said desired stepping rate includes 0.667 times of said structural frequency.

6. The method of claim 1, wherein said desired stepping rate includes 0.4285 times of said structural frequency.

7. The method of claim 1, wherein said desired stepping rate includes 0.4 times of said structural frequency.

8. The method of claim 1, wherein said desired stepping rate includes 0.3 times of said structural frequency.

9. The method of claim 1, wherein said desired stepping rate includes 0.2857 times of said structural frequency.

10. The method of claim 1, wherein said mechanism comprises a solar wing driver.

11. The method of claim 1, where said mechanism comprises an antenna reflector positioner.

12. The method of claim 1, wherein said mechanism comprises a payload platform positioner.

13. The method of claim 1, wherein said mechanism comprises a payload scanning gimbal.

14. In a spacecraft having at least one solar array controlled by a stepping mechanism having a stepper motor for rotating the at least one solar array, the at least one solar array having a structural frequency, a method for reducing stepping disturbances, comprising the steps of:

generating a desired first stepping rate and a desired second stepping rate slower than the first stepping rate from said structural frequency of said at least one solar array to step said stepping mechanism; and alternately stepping between said first stepping rate and said second stepping rate to generate an average stepping rate of said stepping mechanism that equals to a desired stepping rate of the rotational rate of the at least one solar array, and thereby reducing the induced stepping disturbances generated by said stepper motor.

15. The method of claim 14, further comprising the step of calculating said desired stepping rate by solving $$\frac{\sin\frac{\pi(n+1)}{s}}{\sin\frac{\pi}{s}} = 1,$$

n=0,1, ... for S where s represents said stepper motor stepping at s times of said structural frequency.

16. The method of claim 14, whererin said desired stepping rate includes 3 times of said structural frequency.

17. The method of claim 14, wherein said desired stepping rate includes 2 times of said structural frequency.

18. The method of claim 14, wherein said desired stepping rate includes 0.75 times of said structural frequency.

19. The method of claim 14, wherein said desired stepping rate includes 0.667 times of said structural frequency.

20. The method of claim 14, wherein said desired stepping rate includes 0.4285 times of said structural frequency.

21. The method of claim 14, wherein said desired stepping rate includes 0.4 times of said structural frequency.

22. The method of claim 14, wherein said desired stepping rate includes 0.3 times of said structural frequency.

23. The method of claim 14, wherein said desired stepping rate includes 0.2857 times of said structural frequency.

24. The method of claim 14, wherein said stepping mechanism comprises a solar wing driver.

25. An apparatus for reducing stepping disturbances generated by a stepper motor which is controlled by a mechanism exciting a structural frequency, the apparatus comprising:

means for generating a desired stepping rate from said structural frequency to step said mechanism; and means for stepping said mechanism at said desired stepping rate of said structural frequency, thereby reducing the induced stepping disturbances generated by said stepper motor;

wherein the means for stepping the stepping mechanism at said desired stepping rate of said structural frequency comprises means for stepping said stepper motor at a first stepping rate and a second stepping rate slower than the first stepping rate to generate an average stepping rate that equals said desired stepping rate.

26. The apparatus of claim 25, wherein said desired stepping rate is calculated by solving $$\frac{\sin\frac{\pi(n+1)}{s}}{\sin\frac{\pi}{s}} = 1,$$

n=0,1, ... for s where s represents said stepper motor stepping at s times of said structural frequency.

27. The apparatus of claim 25, wherein said desired stepping rate includes 3 of said structural frequency.

28. The apparatus of claim 25, wherein said desired stepping rate includes 2 times of said structural frequency.

29. The apparatus of claim 25, wherein said desired stepping rate includes 0.75 times of said structural frequency.

30. The apparatus of claim 25, wherein said desired stepping rate includes 0.667 times of said structural frequency.

31. The apparatus of claim 25, wherein said desired stepping rate includes 0.4285 times of said structural frequency.

32. The apparatus of claim 25, wherein said desired stepping rate includes 0.4 times of said structure frequency.

33. The apparatus of claim 25, wherein said desired stepping rate includes 0.3 times of said structural frequency.

34. The apparatus of claim 25, wherein said desired stepping rate includes 0.2857 times of said structural frequency.

35. The apparatus of claim 25, wherein said device comprises a solar wing driver.

36. The apparatus of claim 25, wherein said device comprises an antenna reflector positioner.

37. The apparatus of claim 25, wherein said device comprises a payload platform positioner.

38. The apparatus of claim 25, wherein said device comprises a payload scanning gimbal.

* * * * *